(12) United States Patent
Yonishi

(10) Patent No.: US 10,965,925 B2
(45) Date of Patent: Mar. 30, 2021

(54) IMAGE CAPTURING APPARATUS, CLIENT APPARATUS, CONTROL METHOD, AND STORAGE MEDIUM

(71) Applicant: CANON KABUSHIKI KAISHA, Tokyo (JP)

(72) Inventor: Osamu Yonishi, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/418,648

(22) Filed: May 21, 2019

(65) Prior Publication Data

US 2019/0373235 A1 Dec. 5, 2019

(30) Foreign Application Priority Data

May 31, 2018 (JP) .............................. JP2018-104907
Jul. 30, 2018 (JP) .............................. JP2018-142031

(51) Int. Cl.
 *H04N 9/73* (2006.01)
 *H04N 5/33* (2006.01)
 *H04N 5/77* (2006.01)
 *H04N 7/18* (2006.01)

(52) U.S. Cl.
 CPC .............. *H04N 9/735* (2013.01); *H04N 5/33* (2013.01); *H04N 5/77* (2013.01); *H04N 7/183* (2013.01)

(58) Field of Classification Search
 CPC ............ H04N 9/735; H04N 5/33; H04N 5/77; H04N 7/183
 See application file for complete search history.

(56) References Cited

U.S. PATENT DOCUMENTS

| 2012/0098971 | A1 | 4/2012 | Hansen et al. |
| 2013/0208125 | A1 | 8/2013 | Richardson et al. |
| 2014/0028817 | A1* | 1/2014 | Brockway, III .... H04N 5/23225 348/61 |
| 2015/0294168 | A1 | 10/2015 | Artan et al. |
| 2016/0255600 | A1* | 9/2016 | Hayami ................ H04L 7/0091 370/350 |
| 2018/0052057 | A1 | 2/2018 | Richards et al. |
| 2018/0131918 | A1 | 5/2018 | Dolinar |

FOREIGN PATENT DOCUMENTS

| CA | 2947712 A1 | 5/2018 |
| CN | 104052937 A | 9/2014 |
| EP | 2779631 A2 | 9/2014 |
| JP | 2006-345309 A | 12/2006 |
| JP | 4948011 B2 | 6/2012 |

* cited by examiner

*Primary Examiner* — Mishawn N. Hunter
(74) *Attorney, Agent, or Firm* — Canon U.S.A., Inc. IP Division

(57) ABSTRACT

An image capturing apparatus includes an image capturing unit configured to capture an infrared image and generate image data, a holding unit configured to hold a plurality of color palettes, a conversion unit configured to convert the image data into image data for display based on a the color palette of the plurality of color palettes; and a determination unit configured to determine, from among the plurality of color palettes, the color palette that is to be used by the conversion unit.

37 Claims, 20 Drawing Sheets

FIG.5

COLOR PALETTE FOR MONOCHROME DISPLAY

501

| | |
|---|---|
| 255 | 255,255,255 |
| 254 | 255,255,255 |
| 253 | 240,240,240 |
| 252 | 240,240,240 |
| ⋮ | ⋮ |
| 3 | 10,10,10 |
| 2 | 10,10,10 |
| 1 | 0,0,0 |
| 0 | 0,0,0 |

COLOR PALETTE FOR COLOR DISPLAY

502

| | |
|---|---|
| 255 | 255,0,0 (RED) |
| 254 | 255,0,0 (RED) |
| 253 | 240,0,0 |
| 252 | 240,0,0 |
| ⋮ | ⋮ |
| 3 | 0,0,240 |
| 2 | 0,0,240 |
| 1 | 0,0,255 (BLUE) |
| 0 | 0,0,255 (BLUE) |

FIG.17

| COLOR PALETTE NUMBER | TYPE | PRIORITY |
|---|---|---|
| 1 | MONOCHROME | 4 |
| 2 | MONOCHROME (INVERTED) | 1 |
| 3 | COLOR 1 | 2 |
| 4 | COLOR 1 (INVERTED) | 6 |
| 5 | COLOR 2 | 3 |
| 6 | COLOR 3 | 7 |
| 7 | COLOR 4 | 5 |

FIG.18

| COLOR PALETTE NUMBER | TYPE | PRIORITY | RESOLUTION | FRAME RATE |
|---|---|---|---|---|
| 1 | MONOCHROME | 4 | 320 × 240 | 1(fps) |
| 2 | MONOCHROME (INVERTED) | 1 | 640 × 360 | 30(fps) |
| 3 | COLOR 1 | 2 | 320 × 240 | 1(fps) |
| 4 | COLOR 1 (INVERTED) | 6 | 320 × 240 | 1(fps) |
| 5 | COLOR 2 | 3 | 320 × 240 | 1(fps) |
| 6 | COLOR 3 | 7 | 320 × 240 | 1(fps) |
| 7 | COLOR 4 | 5 | 320 × 240 | 1(fps) | though
IMAGE CAPTURING APPARATUS, CLIENT APPARATUS, CONTROL METHOD, AND STORAGE MEDIUM

BACKGROUND OF THE INVENTION

Field of the Invention

The present invention relates to a technique for distributing a captured infrared image.

Description of the Related Art

In recent years, network cameras for monitoring using infrared light have been increasing, where the infrared light enables adequate images for monitoring to be captured even under unfavorable conditions, such as a nighttime, raining, or snowing.

An infrared camera detects infrared rays emitted from an object with a dedicated sensor and processes the detected data to thereby generate a visible video image.

Meanwhile, an index color method is typically used to display an infrared video image. The index color method is an image format in which each pixel of image data has not color information but an index value for referring to a color information table. The color information table is generally referred to as a color palette.

An image for display is generated by applying color information of the color palette and stored, in general, after being compressed. A typical compression method is a Motion Pictures Experts Group-4 (MPEG-4) or H.264 method for moving images, and a Joint Photographic Experts Group (JPEG) method for still images.

Japanese Patent No. 4948011 discusses a technique in which two temporary storage areas for image (raw) data output from a sensor are provided to thereby separately execute development processing for moving images and development processing for still images. The raw data is stored only in a temporary memory area, such as a dynamic random access memory (DRAM), whereas developed image data is compressed and then recorded in a non-volatile area, such as a secure digital (SD) card or flash memory.

In the case where only developed image data is internally stored in a network camera configured to capture infrared images, it is not possible to reproduce the image with the color palette being changed based on an image capturing environment or subject. Thus, image visibility decreases, resulting in a large loss in user convenience.

Japanese Patent Application Laid-Open No. 2006-345309 discusses a method in which different image quality parameters are applied to captured video image data and the results are simultaneously displayed.

In the method discussed in Japanese Patent Application Laid-Open No. 2006-345309, different image quality parameters (brightness, contrast, hue, sharpness) are applied to video image data having red-green-blue (RGB) or YUV color information. However, the technique discussed in Japanese Patent Application Laid-Open No. 2006-345309 infrared image capturing is not considered, and it is difficult to adjust the image quality by applying the image quality parameters without change to the index values having no concept of brightness or contrast.

SUMMARY OF THE INVENTION

According to an aspect of the present disclosure, an image capturing apparatus includes an image capturing unit configured to capture an infrared image and generate image data, a holding unit configured to hold a plurality of color palettes, a conversion unit configured to convert the image data into image data for display based on a color palette of the plurality of color palettes; and a determination unit configured to determine, from among the plurality of color palettes, the color palette that is to be used by the conversion unit.

Further features of the present invention will become apparent from the following description of exemplary embodiments with reference to the attached drawings.

BRIEF DESCRIPTION OF THE DRAWINGS

FIG. 5 is a schematic diagram illustrating color palettes.

FIG. 17 is a table illustrating color palette management information.

FIG. 18 is a table illustrating color palette management information.

DESCRIPTION OF THE EMBODIMENTS

Various exemplary embodiments of the present disclosure will be described below with reference to the accompanying drawings.

Figure 1A:
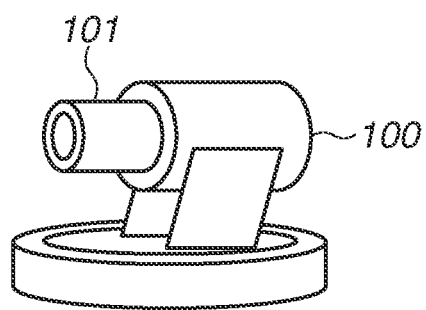
FIGS. 1A and 1B are schematic views each illustrating an exterior of a network camera.
Figure 1B:
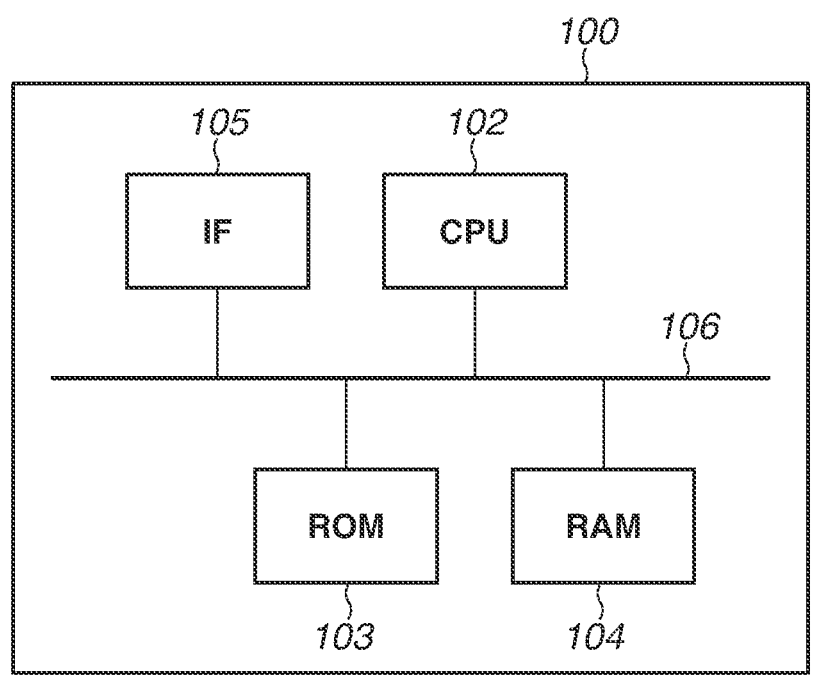

A first exemplary embodiment of the present disclosure will be described below in detail. FIG. 1A is an external view illustrating a network camera according to an exemplary embodiment of the present disclosure. A network camera 100 includes a barrel portion 101 including a lens for imaging infrared light and an image sensor (infrared image capturing unit). FIG. 1B is a block diagram schematically illustrating a hardware configuration relating to information processing of the network camera 100. A central processing unit (CPU) 102 is a central processing device configured to comprehensively control the network camera 100. An interface (IF) 105 communicates with a client apparatus via a network according to a protocol, such as an Internet protocol or Open Network Video Interface Forum (ONVIF) protocol.

A read-only memory (ROM) 103 includes a storage element, such as a flash memory, and is a non-volatile memory configured to store a program and parameter for use by the CPU 102 to cause the network camera 100 to execute a process illustrated in a flowchart described below or to realize a function block described below. A random access memory (RAM) 104 temporarily stores part of a computer program executed by the CPU 102 and an intermediate value. The RAM 104 may function as a buffer for temporarily storing data externally obtained via the IF 105.

Figure 2:
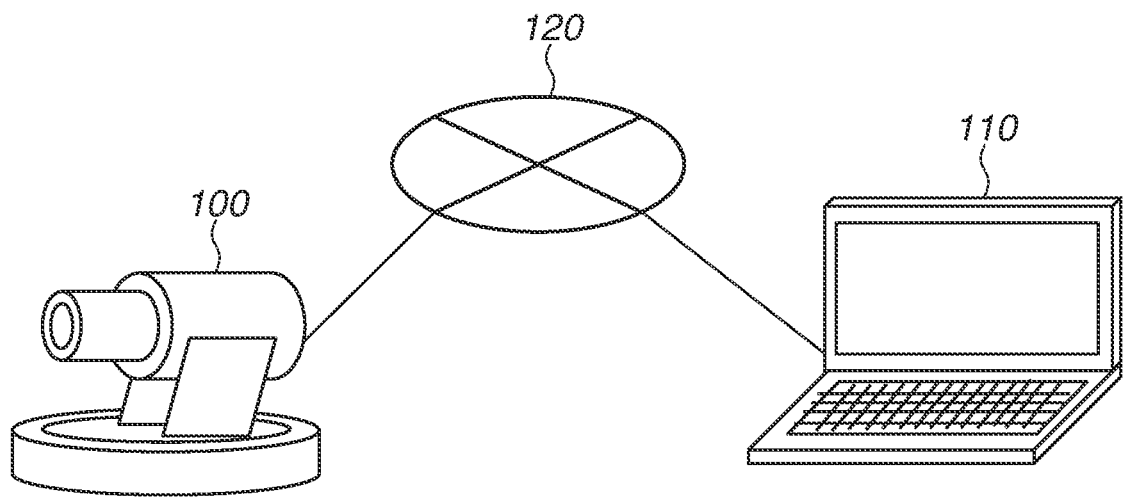
FIG. 2 is a schematic view illustrating a network configuration of the network camera.

FIG. 2 illustrates a system configuration including the network camera 100. A client apparatus 110 is an external device in the present exemplary embodiment. The network camera 100 and the client apparatus 110 are communicably connected via a network 120. The client apparatus 110 transmits various commands to the network camera 100. The network camera 100 transmits responses to the commands to the client apparatus 110.

Figure 3:
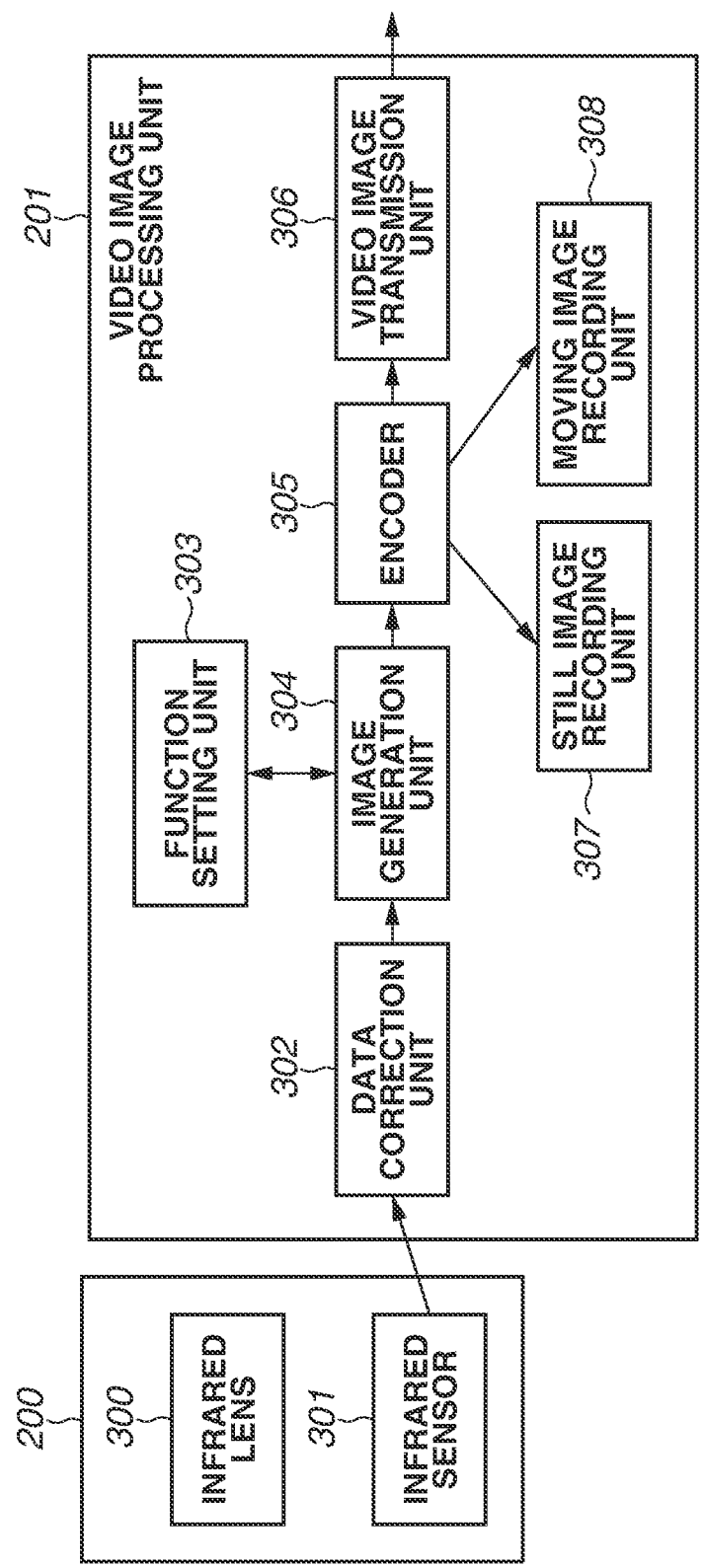
FIG. 3 is a block diagram illustrating a schematic configuration of the network camera.

A configuration and function of each component of the network camera 100 will be described below with reference to FIG. 3.

A barrel portion 200 includes an infrared lens 300 and an infrared sensor 301. While a wavelength range covered by a lens or sensor varies depending on a material used in the lens or sensor, the infrared lens 300 and the infrared sensor 301 according to the present exemplary embodiment cover far-infrared rays (wavelength: 4 μm to 1000 μm).

A video image processing unit 201 has the function of receiving information about an image captured by the barrel portion 200 and converting the information into image data. A data correction unit 302 normalizes and quantizes the information (intensity of far-infrared rays) received from the infrared sensor 301 to thereby convert the information into an index value (infrared image) for referring to a color information table (color palette). In the present exemplary embodiment, an index value of 1 pixel is 1 byte (8 bits), and 256 color types are expressible for each pixel. Details of the color palette will be described later.

An image generation unit 304 converts the index value into color data represented by red, green blue (RGB) (a format in which each RGB component is expressed in 8 bits) using the color palette designated by a function setting unit 303 and generates a displayable image. An encoder 305 executes compression processing on the moving or still image generated by the image generation unit 304. A video image transmission unit 306 transmits the compressed moving image data to the client apparatus 110 via a network.

A still image recording unit 307 receives data converted into Joint Photographic Experts Group (JPEG) data or raw data from the encoder 305, generates a file, and records the file in a secure digital (SD) card or built-in memory.

A moving image recording unit 308 receives converted data in, for example, Motion Pictures Experts Group-4 (MPEG-4), H.264, and High Efficiency Video Coding (HEVC) format from the encoder 305, generates a file, and records the generated file in an SD card or built-in memory.

Figure 4A:
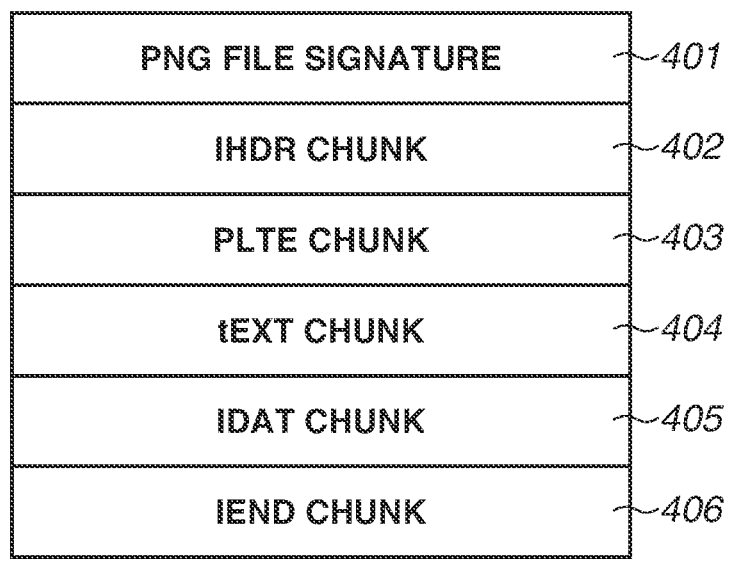
FIGS. 4A and 4B are schematic diagrams illustrating a portable network graphics (PNG) file format.
Figure 4B:
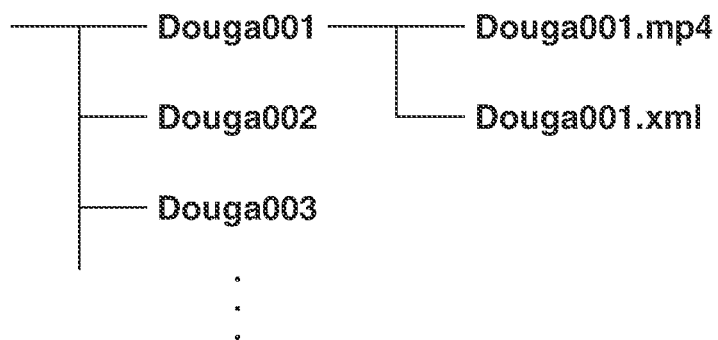

Next, a relationship between image data with the index values and the color palettes will be described below with reference to FIGS. 4A, 4B and 5. In the present exemplary embodiment, a portable network graphics (PNG) format is used as a representative image format having an index value for referring to the color palettes for each pixel. FIG. 4A illustrates a PNG file format. An area 401 is a PNG file signature indicating that the file is a PNG format file. The hexadecimal numeral "89 50 4E 47 0D 0A 1A0A" is described. An area 402 is an IHDR chunk indicating an image header and contains information indicating "palette is used" and information indicating "image width" and "image height". An area 403 is a PLTE chunk storing the main body of each color palette and containing one or more palettes (palette configuration will be described below with reference to FIG. 5). An area 404 contains text information, and an area 405 is an IDAT chunk storing the index values for all pixels included in the image. An area 406 indicates the end of the image. FIG. 4B illustrates a data configuration of a moving image file recorded in a recording medium, such as a secure digital (SD) card, or a storage on a network by the moving image recording unit 308. A plurality of folders is generated with Douga001 being the first folder, and each folder stores a moving image file corresponding to the folder and a metadata storage file (Douga001.xml) corresponding to the moving image file. In the metadata file, color palette information (the color palette or address information for reading the color palette) used in generating the video image is described in Extensible Markup Language (XML) format.

FIG. 5 illustrates a color palette configuration. A color palette 501 is a color palette (color palette for monochrome display) for displaying an image in monochrome and is capable of representing 256-level grayscale from 0 to 255. For example, the color palette 501 specifies that an index value "252" of a pixel of an index image is to be converted into pixel values (R, G, B) of (240, 240, 240). Further, the color palette 501 specifies that an index value "3" of a pixel of the index image is to be converted into pixel values (R, G, B) of (10, 10, 10).

An image can be displayed with black and white inverted by inverting the index values of the color palette. For example, the index value "3" of a pixel of the index image can be converted into (R, G, B)=(240, 240, 240) and the index value "252" into (R, G, B)=(10, 10, 10).

A color palette 502 is used for color display, and a user can generate the color palette by setting desired color information. A cold color, such as blue, is assigned to a low temperature portion (portion with a small far-infrared component value), and a warm color, such as red, is assigned to a high temperature portion (portion with a large far-infrared component value). For example, the color palette 502 specifies that the index value "252" of a pixel of the index image is to be converted into (R, G, B) pixel values (240, 0, 0). Further, the color palette 502 specifies that the index value "3" of a pixel of the index image is to be converted into (R, G, B) pixel values (0, 0, 240). It is also possible to hold a plurality of types of color palettes for color display.

Figure 6:
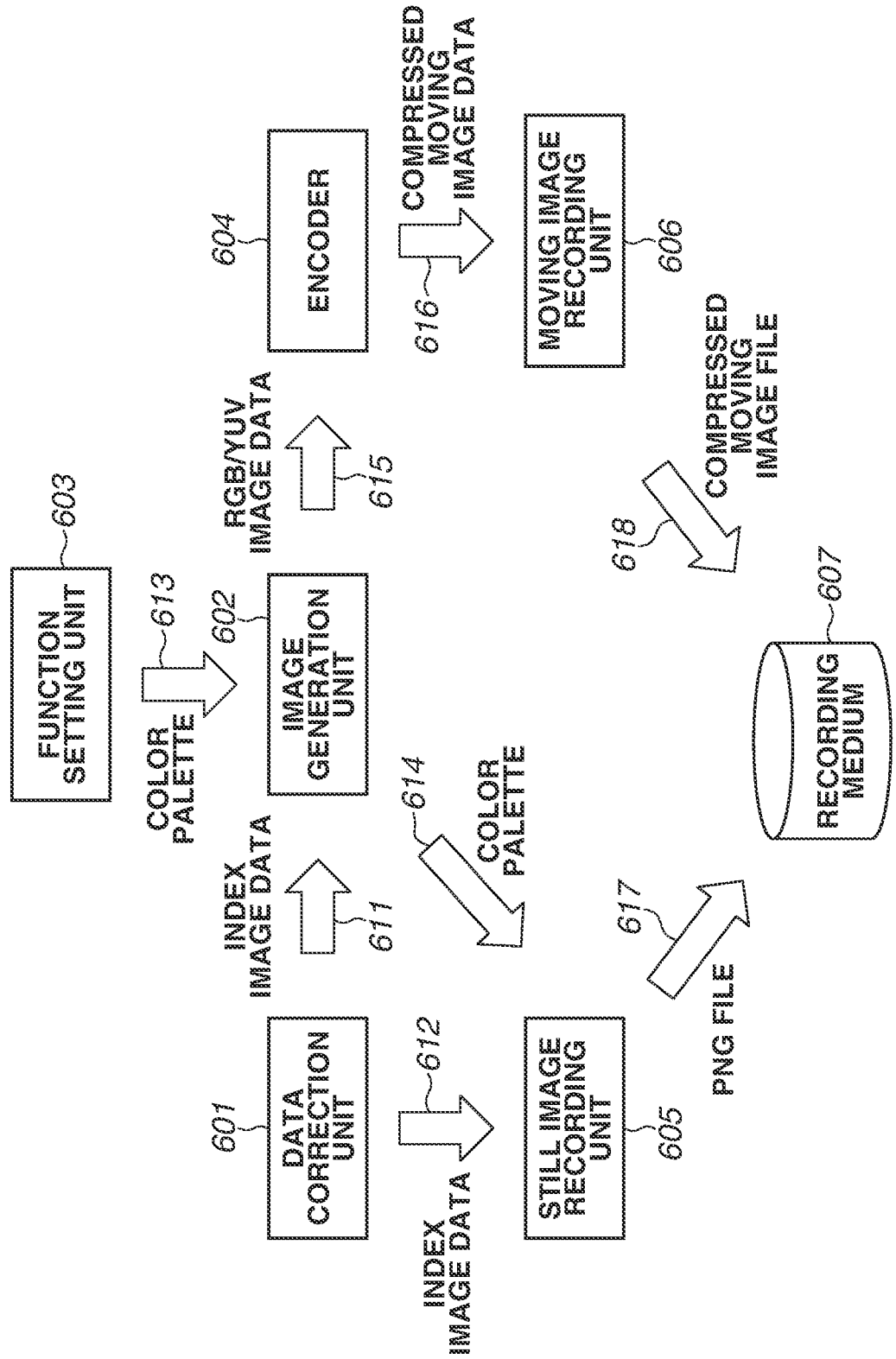
FIG. 6 is a schematic diagram illustrating an image recording process and a data flow in the process.

Next, a process of generating video image data will be described below with reference to FIG. 6. First, a process of recording moving image data will be described below.

A data correction unit 601 generates image data converted into the index values through normalization and quantization of sensor-detected values acquired from the infrared sensor 301, and transmits the generated image data to an image generation unit 602 (611). The image generation unit 602 receives color palette data, set by the user, from a function setting unit 603 (613). The function setting unit 603 stores in advance a plurality of color palettes and information indicating a correspondence relationship between the plurality of color palettes and display modes. If the user selects an infrared image display mode using a graphical user interface (not illustrated) of the client apparatus side, the user-selected display mode is transmitted to the camera side, and the color palette corresponding to the user-selected display mode is output from the function setting unit 603.

The image generation unit 602 generates image data converted into color information in the color palette using the index values of the image, and transmits the generated image data to an encoder 604 (615). In the present exemplary embodiment, the image generation unit 602 converts the data into the image data for display using the color palette 501 (first color palette) for monochrome display illustrated in FIG. 5. As used herein, the term "image data for display" refers to an image data converted by applying the color palette.

The encoder 604 compresses the received image data for display to thereby generate compressed moving image data in, for example, MPEG-4, H.264, or HEVC format and transmits the generated image data to a moving image recording unit 606 (616). The moving image recording unit 606 buffers the compressed image data from the start to end of recording, and stores the buffered image data in a recording medium 607 when the recording ends (618).

Next, a process of recording index image data (infrared image) will be described below. The data correction unit 601 transmits the image data converted into the index values to a still image recording unit 605 (612). The still image recording unit 605 receives a plurality of color palettes that is usable by the image generation unit 602 (614). The still image recording unit 605 then generates a PNG file (image data for reference) including the image data and the plurality of color palettes, and stores the generated PNG file in the recording medium 607 (617). In the present exemplary embodiment, the still image recording unit 605 receives at least the color palette 502 (second color palette) for color display illustrated in FIG. 5. Specifically, the plurality of color palettes at least needs to include one or more color palettes other than the color palette 501 for monochrome display. Herein, "image data for reference" refers to image data that is not suitable for display unless the pixel values are converted using any one of the color palettes.

Figure 7:
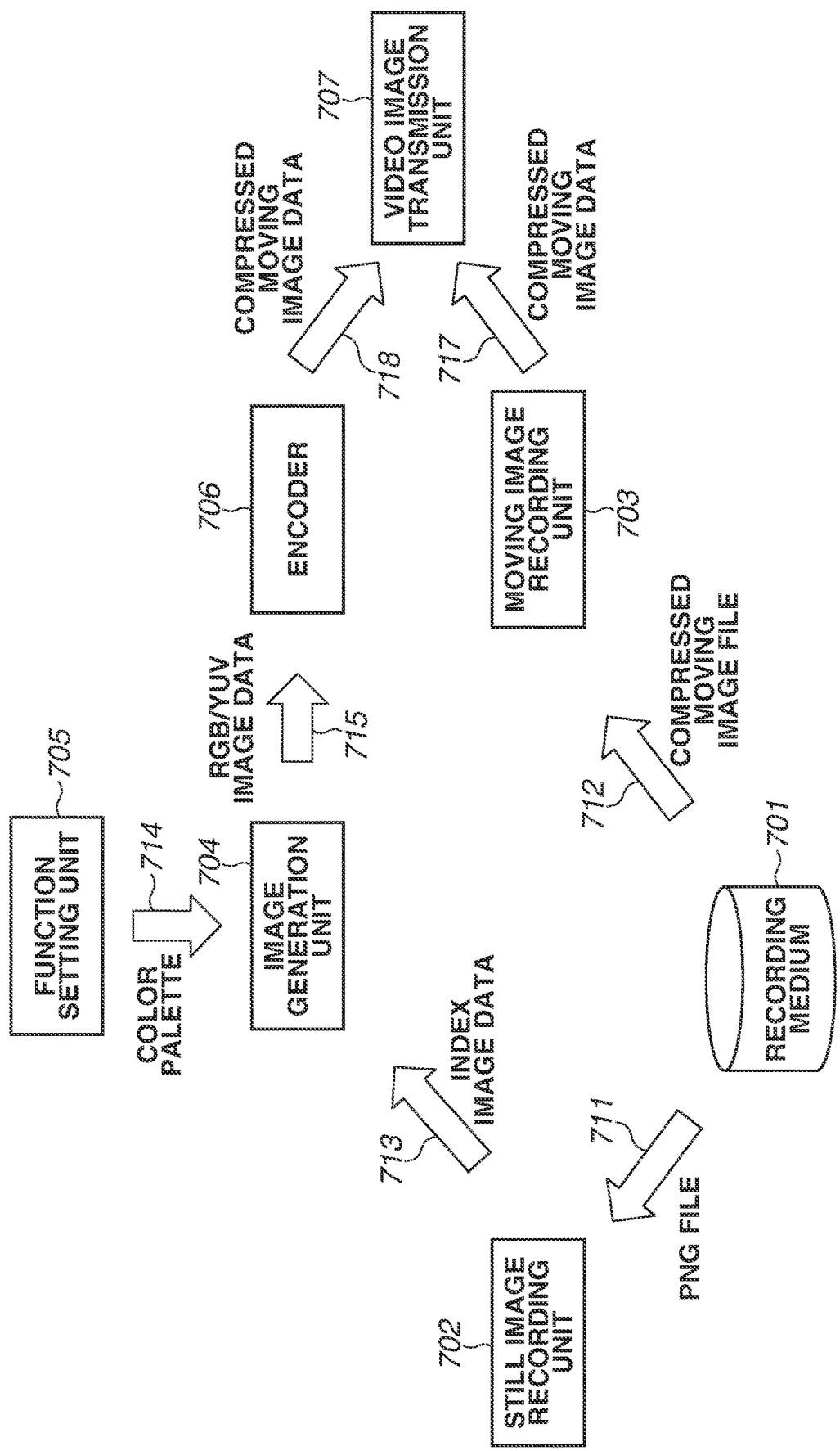
FIG. 7 is a schematic diagram illustrating an image reproduction process and a data flow in the process.

Next, a method for reproducing moving image data and index image data stored in a recording medium 701 and distributing the reproduced image data to a client apparatus will be described below with reference to FIG. 7.

A moving image recording unit 703 reads compressed moving image data from the recording medium 701 (712). The moving image recording unit 703 transmits the compressed moving image data to a video image transmission unit 707 in order to distribute the compressed moving image data to a network (717). The video image transmission unit 707 distributes the moving image data to a client apparatus using a video image transmission protocol, such as Real-Time Transport Protocol (RTP).

Next, a method for reproducing index image data and distributing the reproduced index image data to a client apparatus will be described below.

A still image recording unit 702 reads index image data stored in PNG format from the recording medium 701 (711). The still image recording unit 702 transmits the index image data to an image generation unit 704 (713). The image generation unit 704 obtains a set color palette from a function setting unit 705 (714). The function setting unit 705 can select any color palette from the plurality of user-set color palettes that is useable by the image generation unit 704.

Next, the image generation unit 704 generates image data for display converted into the one having color information in the color palette using the index values of the image, and transmits the generated image data to an encoder 706 (715). The encoder 706 compresses and converts the image data and transmits the image data to the video image transmission unit 707 (718). The video image transmission unit 707 distributes the moving image data to a client apparatus using a video image transmission protocol, such as RTP. As described above, since the image data for display and the index image data are both able to be distributed, the user can select a desired palette from among the plurality of color palettes, and the client apparatus can receive the selected color palette and selectively reproduce image data that corresponds to one of the image data for display and the index image data.

As described above, according to the present exemplary embodiment, in a case where an image captured by an infrared camera is compressed and then the compressed image is reproduced, image data based on a desired color palette among the color palettes that is useable by the image generation unit 602 can be designated by the user and reproduced.

A second exemplary embodiment of the present disclosure will be described. While the video image recording method according to the first exemplary embodiment is silent on a timing to save the index image data, the images can be saved at regular intervals to prevent missing of image capturing of an important scene in a case of using a network camera for monitoring purpose.

A method according to the present exemplary embodiment will be described below in which index image data is saved at a certain regular interval and reproduced in synchronization with separately-saved moving image data. The component or step having a similar function to that in the first exemplary embodiment is given the same reference numeral, and description of those that are similar in configuration or function to those in the first exemplary embodiment is omitted.

Figure 8:
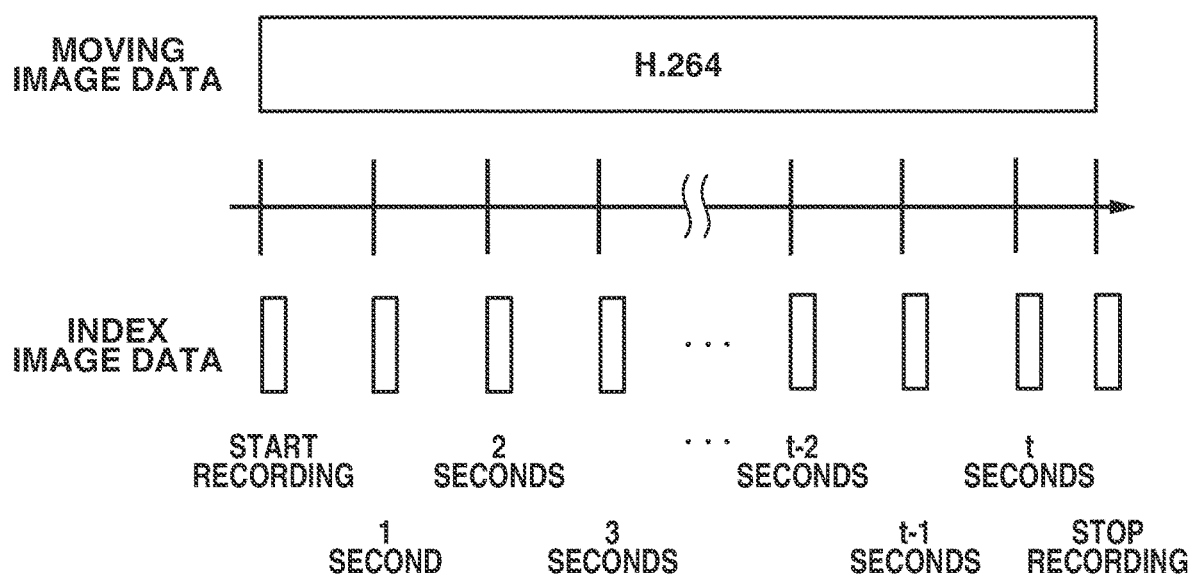
FIG. 8 is a schematic diagram illustrating chronological recording timings.

FIG. 8 is a schematic view illustrating the timings to record the moving image data and the index image data. In the index image data saving process described above in the first exemplary embodiment, the still image recording unit 605 generates a PNG file for the index image data received for each frame from the data correction unit 601 and saves the generated PNG file in the recording medium 607 at a certain time interval. FIG. 8 illustrates an example in which the still image recording unit 605 saves the generated files at 1-second intervals.

Figure 9:
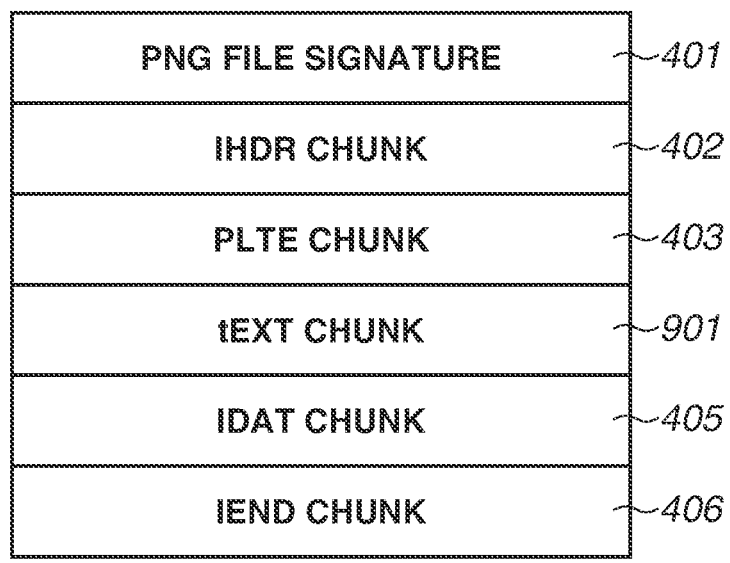
FIG. 9 is a schematic diagram illustrating a PNG file format.

In order to reproduce the moving image data and the index image data in synchronization, time information needs to be added to the PNG file and saved. FIG. 9 illustrates a PNG file configuration. Desired text information can be added to a tEXT chunk area 901, and the still image recording unit 605 converts time information included in the moving image data into character information and saves the character information at the time of generating the PNG file.

Figure 11:
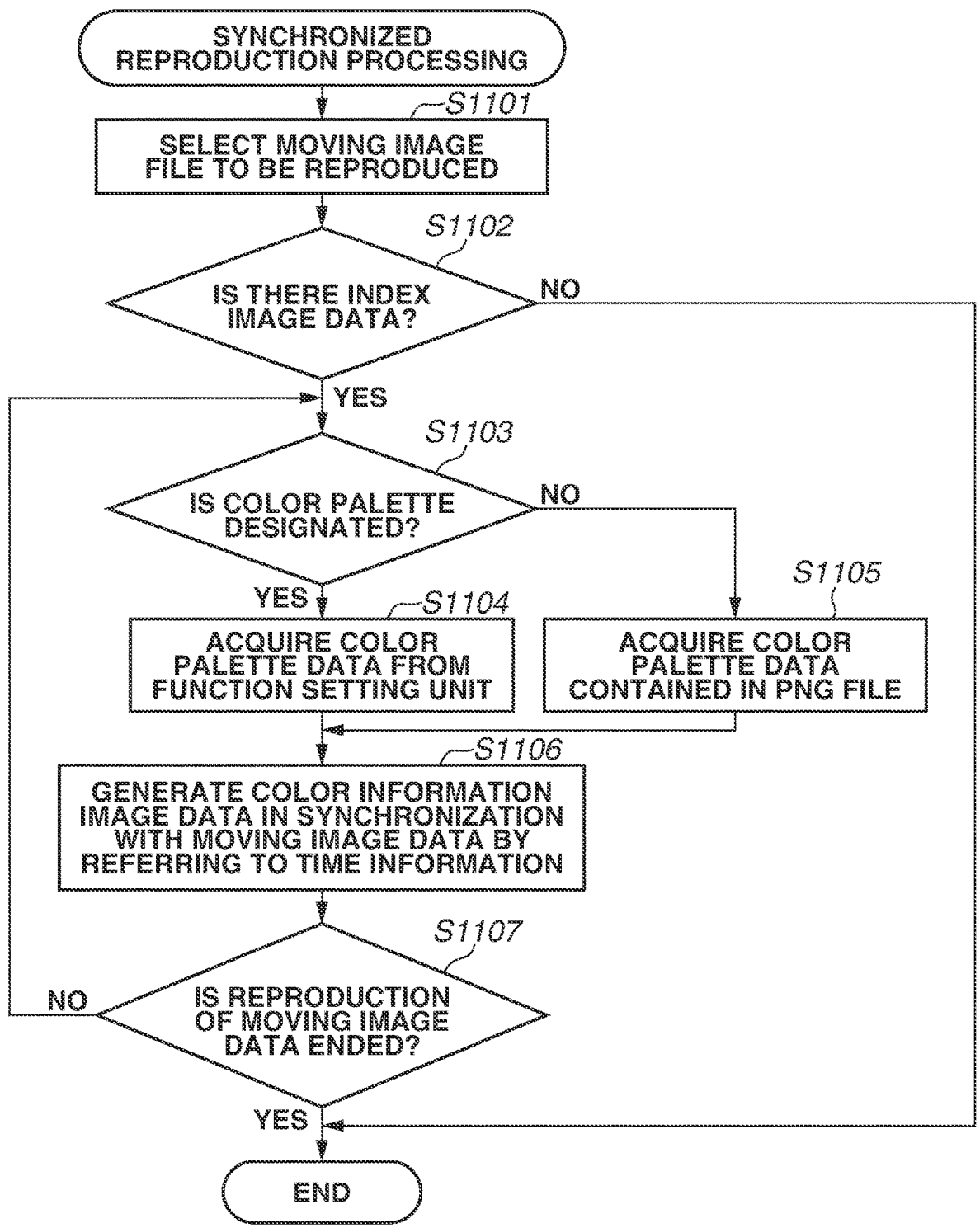
FIG. 11 is a flowchart illustrating an image reproduction process.

Next, a method for reproducing the moving image data and the index still image data in synchronization will be described below with reference to FIGS. 7 and 11. The process is executed by the image generation unit 704.

In step S1101, the user selects moving image data to be reproduced. In step S1102, the image generation unit 704 checks whether there is index image data corresponding to the selected moving image data. If there is no corresponding index image data (NO in step S1102), the process ends. If there is corresponding index image data (YES in step S1102), the processing proceeds to step S1103. In step S1103, the image generation unit 704 checks whether a color palette to be used in the reproduction is designated.

If a color palette is designated (YES in step S1103), the processing proceeds to step S1104. In step S1104, the image generation unit 704 acquires color palette data from the function setting unit 705. If no color palette is designated (NO in step S1103), the processing proceeds to step S1105. In step S1105, the image generation unit 704 acquires color palette data included in the PNG file. In step S1106, the image generation unit 704 refers to the time information of the PNG file, and generates image data including color information in synchronization with the time information of the moving image data. In step S1107, the image generation unit 704 checks whether the moving image data reproduction has ended. If the reproduction has not ended (NO in step S1107), the processing returns to step S1103. If the reproduction has ended (YES in step S1107), the image generation unit 704 ends the process.

Figure 10:
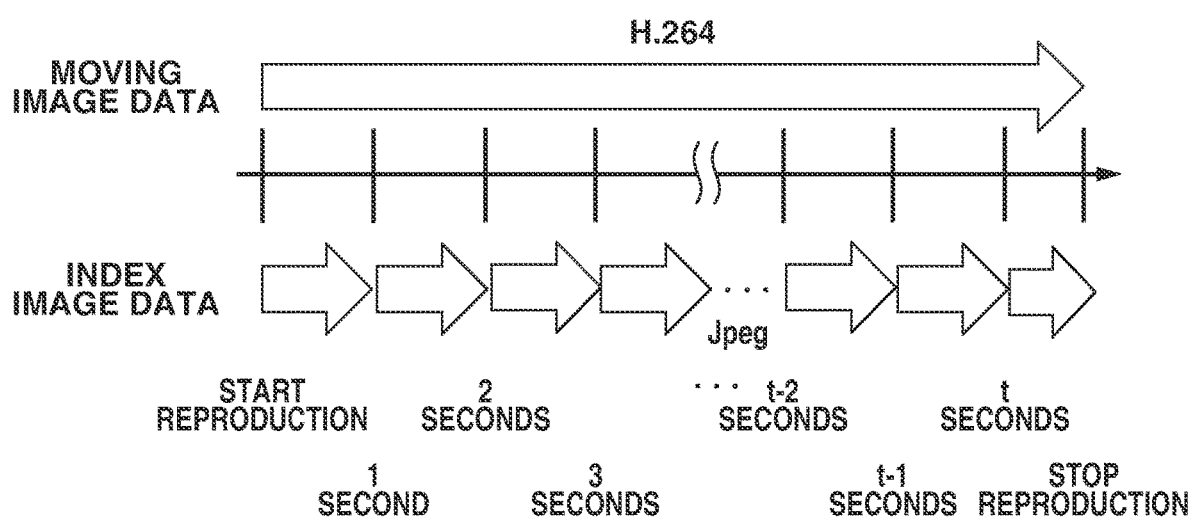
FIG. 10 is a schematic diagram illustrating chronological reproduction timings.

As described above, according to the present exemplary embodiment, synchronized reproduction of the moving image data and the index image data illustrated in FIG. 10 is achieved. The reproduced video images are distributed to the client apparatus so that the user can reproduce and view image data generated using the user-designated color palette simultaneously with the moving image data.

By the user designating a new color palette different from the currently-designated color palette during reproduction, the image data can be displayed with the color information being changed during reproduction.

A third exemplary embodiment of the present disclosure will be described below in detail. A network camera for monitoring has an upper limit on the amount of image data that can be recorded in the camera, so that it is desirable to record image data as efficiently as possible.

In the present exemplary embodiment, a description will be provided of a method for efficiently saving image data using a motion detection result and reproducing image data in synchronization with separately-saved moving image data in the video image recording method according to the first exemplary embodiment. The component or step having a similar function to that in the first or second exemplary embodiment is given the same reference numeral, and description of those that are similar in configuration or function to those in the first or second exemplary embodiment is omitted.

In the case of saving index still image data at regular intervals as in the second exemplary embodiment, there may be no change in the saved images. Thus, if the still image recording unit 605 saves index image data only in a case where there is a moving object, which is detected by using a motion detection function of the network camera 100, the amount of image data is reduced. The CPU 102 of the network camera 100 detects a motion contained in a target frame based on a difference between known frames or a background difference, and during the detection, the CPU 102 transmits a notification of the detection to the video image processing unit 201 at regular intervals. Then, the still image recording unit 605 performs recording based on notification.

Figure 12:
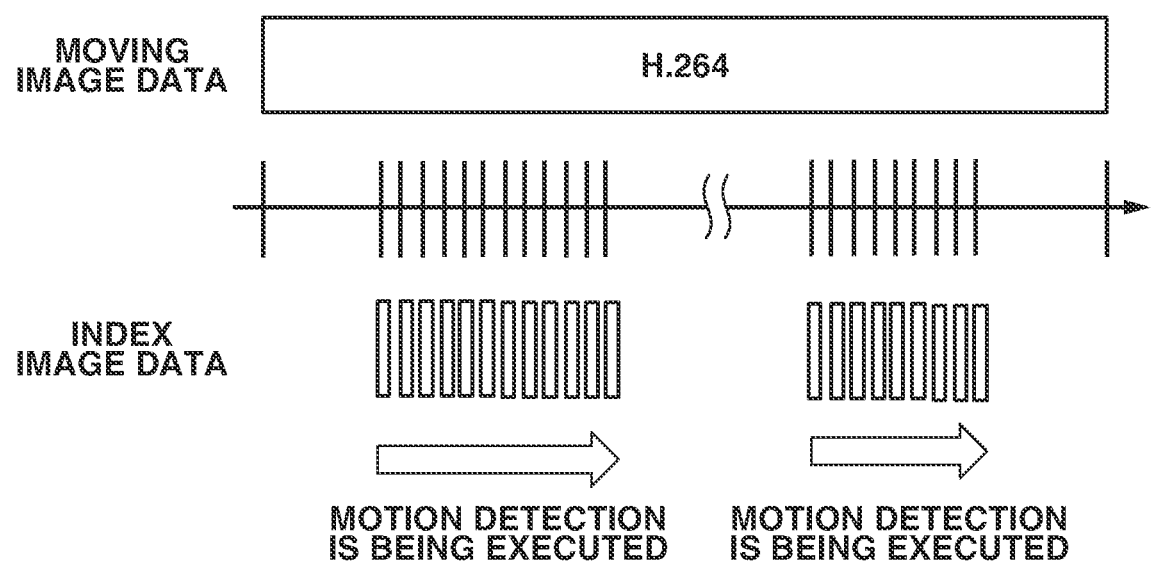
FIG. 12 is a schematic diagram illustrating chronological recording timings.

FIG. 12 illustrates chronological timings of saving index still image data according to the present exemplary embodiment. The occurrence of a recording start event based on detection of a motion triggers an operation of saving index image data in a recording medium at predetermined intervals. The still image recording unit 605 ends the saving operation at a timing at which a motion is not detected (timing at which a notification is not received).

As in the second exemplary embodiment, the still image recording unit 605 adds and saves the same time information as that of the PNG file to the moving image data so that synchronized reproduction of the moving image data and the index image data is still possible even in the case of performing recording triggered by a motion detection event.

As described above, the present exemplary embodiment enables synchronized reproduction of the moving image data and the index image data while efficiently saving the index image data using the motion detection result.

A fourth exemplary embodiment of the present disclosure will be described below. In the above-described exemplary embodiments, image data for display is generated each time according to the type of the color palette set by the function setting unit 303. The present exemplary embodiment is different from the first to third exemplary embodiments in that a plurality of pieces of image data for display corresponding to the plurality of color palettes is generated in advance.

Figure 13:
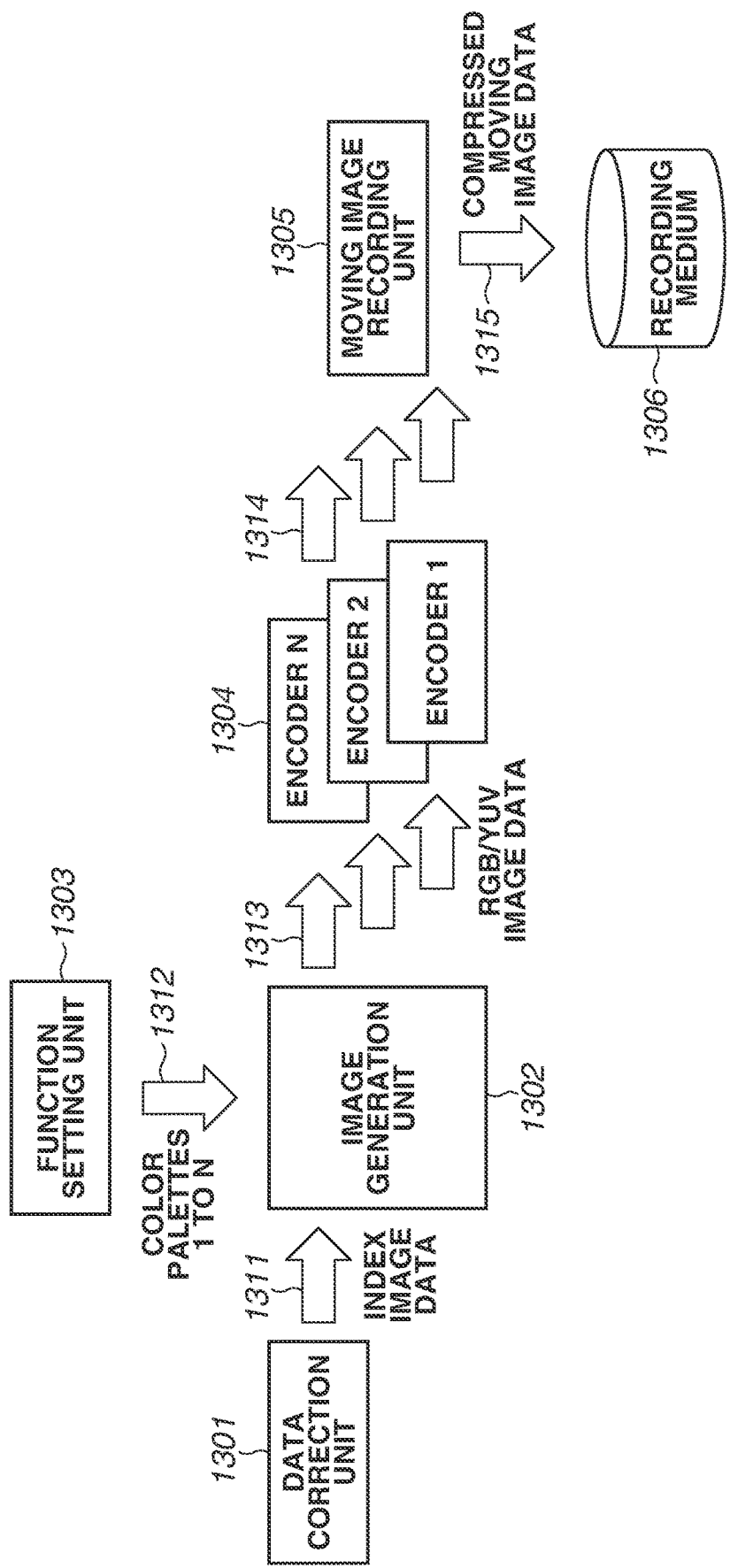
FIG. 13 is a schematic diagram illustrating an image recording process and a data flow in the recording process.

A process and data flow in image recording performed by the video image processing unit 201 will be described below with reference to FIG. 13.

A data correction unit 1301 generates image data in which two-dimensional sensor-detected values acquired by the infrared sensor 301 are converted into index values, and transmits the generated image data as index image data to an image generation unit 1302 (1311). A function setting unit 1303 reads the plurality of color palette data stored in the camera from the ROM 103 (or from the RAM 104 in a case in which the data is loaded into the RAM 104) and transmits the read color palette data to the image generation unit 1302 (1312). The image generation unit 1302 generates a plurality of pieces of image data (image data for display) by converting the index values of the image into color information by referring to the respective color palettes received from the function setting unit 1303, and transmits the generated image data to an encoder 1304 (1313). Details of the process performed by the image generation unit 1302 will be described below.

The encoder 1304 compresses the received plurality of pieces of image data to thereby generate N pieces of compressed moving image data in different formats, such as MPEG4, H.264, or HEVC, and outputs the generated data to a moving image recording unit 1305 (1314). The moving image recording unit 1305 generates an individual file for the plurality (N pieces) of pieces of compressed image data and stores the generated files in a recording medium 1306 or a storage (not illustrated) on a network (1315).

Figure 14:
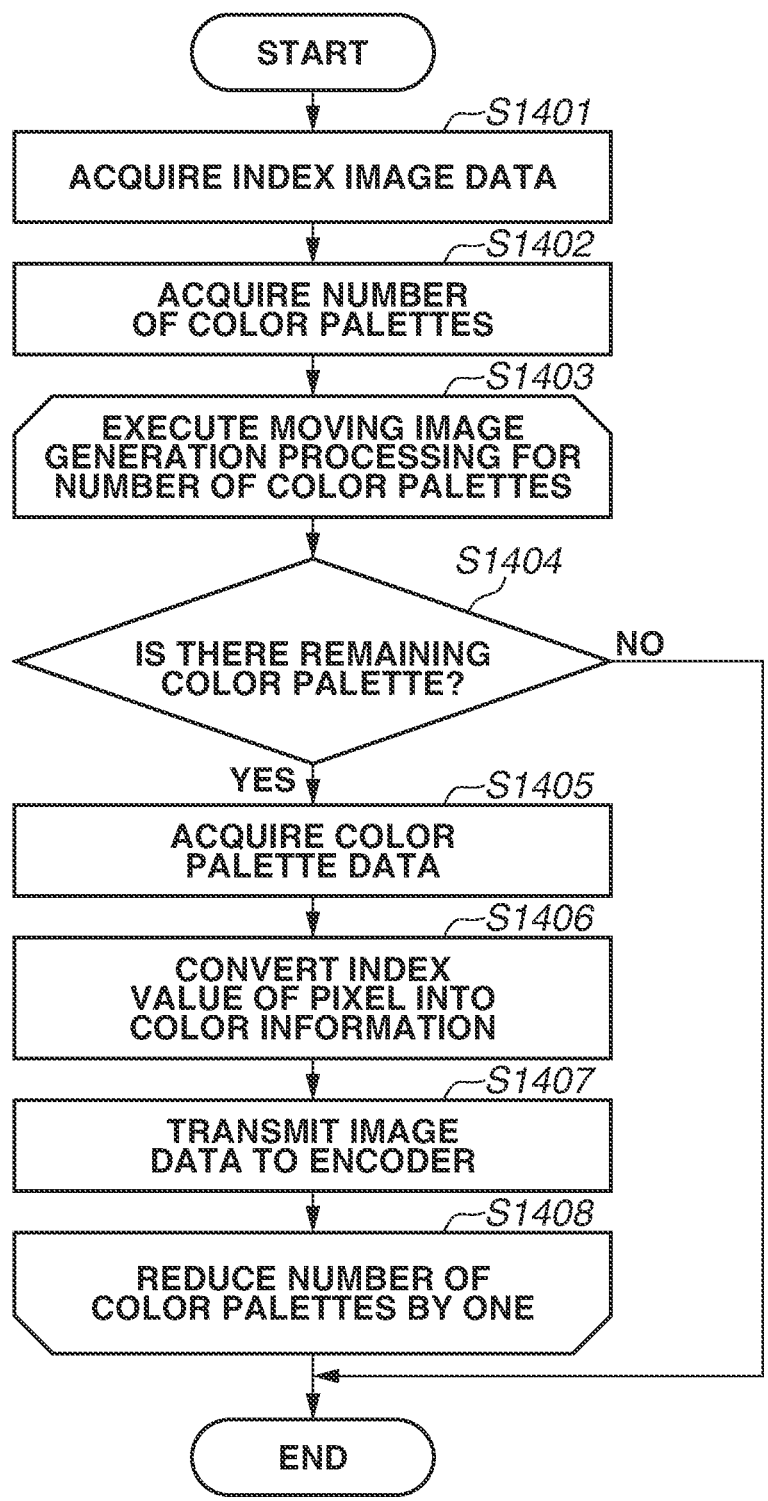
FIG. 14 is a flowchart illustrating a process performed by a moving image generation unit.

Next, details of the processing performed by the image generation unit 1302 will be described below with reference to FIG. 14. In S1401, the image generation unit 1302 acquires index image data from the data correction unit 1301. Next, in step S1402, the image generation unit 1302 acquires information about the number of color palettes held in the camera from the function setting unit 1303. Next, in step S1404, the image generation unit 1302 checks the number of remaining unreferenced color palettes. If there is a remaining unreferenced color palette (YES in step S1404), the processing proceeds to step S1405. In step S1405, the image generation unit 1302 acquires one remaining unreferenced color palette. In step S1406, the image generation unit 1302 converts the index image data into color image data using the color palette values. In step S1407, the image generation unit 1302 transmits the converted color image data to the encoder 1304. In step S1408, the image generation unit 1302 reduces the number of color palettes by one.

In step S1404, if the number of remaining color palettes is zero (NO in step S1404), the image generation unit 1302 ends the processing.

Figure 15:
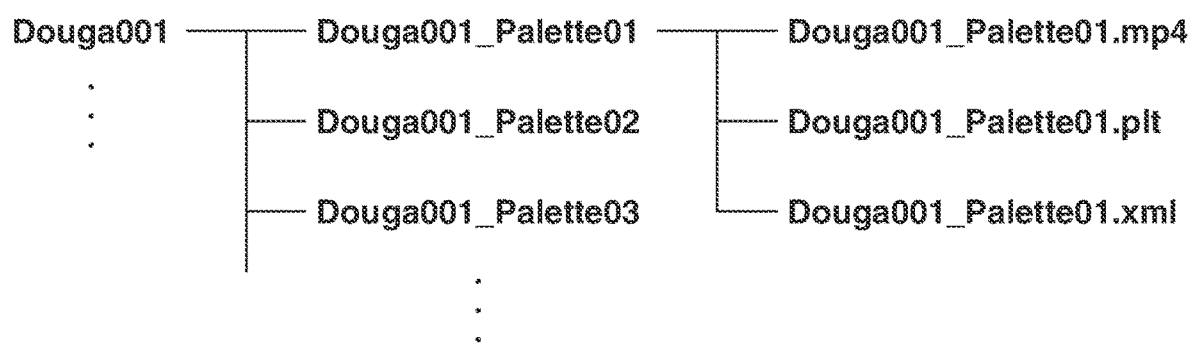
FIG. 15 is a schematic diagram illustrating a file configuration of a recording medium.

FIG. 15 is a schematic view illustrating how the moving image recording unit 1305 stores a plurality of moving image files having different color palettes from each other. A folder for each color palette name (palette name) is generated under a Douga001 folder so that the moving image data generated from the same source is recognizable. In the folder of each palette name, a moving image file acquired by compressing image data generated using the palette corresponding to the palette name and a file storing the color palette data used in the generation are stored. This enables the color palette data used in the generation to be obtained at a later time. In the example illustrated in FIG. 15, the folder with the palette name "Douga001_Palette01" stores color palette data "Douga001_Palette01.plt" corresponding to the palette name, moving image data "Douga001_Palette01.mp4" generated using the color palette and compressed to reduce a data amount through encoding using MPEG4, and metadata "Douga001_Palette01.xml" used in the color palette and the encoding. The metadata contains a frame rate and resolution. In this way, the moving image recording unit 1305 can output the plurality of moving image files, generated by referring to the plurality of color palettes, in association with each other.

Figure 16:
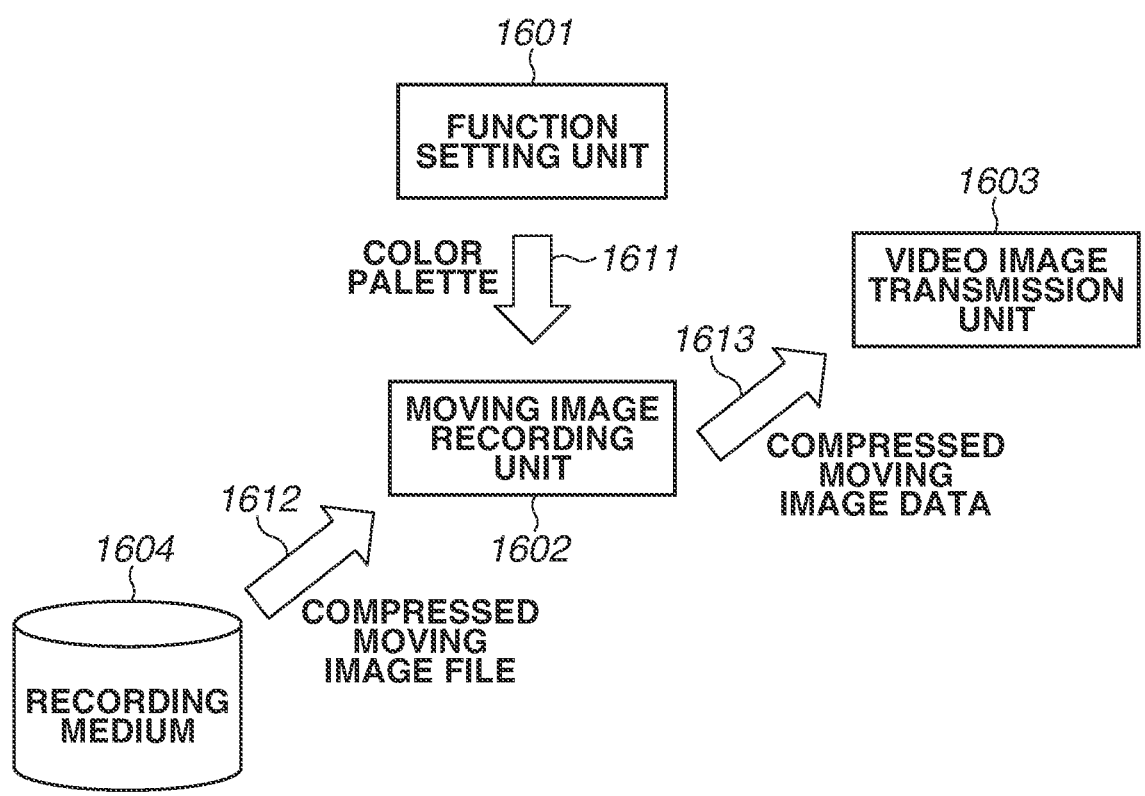
FIG. 16 is a schematic diagram illustrating an image reproduction process and a data flow in the image reproduction process.

Next, with reference to FIG. 16, a description will be provided of a method for reproducing moving image data stored in a recording medium and distributing the reproduced moving image data to a client apparatus.

A moving image recording unit 1602 manages video images recorded in a recording medium 1604. If a video image to be reproduced is designated by the client apparatus, a function setting unit 1601 presents stored color palette information to the client apparatus, and the client apparatus executes an operation to select a color palette and notifies the moving image recording unit 1602 of the selected color palette (1611). The moving image recording unit 1602 identifies a moving image file based on the selected video image and color palette and reads compressed moving image data from the recording medium 1604 (1612).

The moving image recording unit 1602 then transmits the compressed moving image data to a video image transmission unit 1603 to distribute the video image to the client apparatus (1613). The video image transmission unit 1603 distributes the moving image data to the client apparatus using a video image transmission protocol, such as RTP.

As described above, according to the present exemplary embodiment, the moving images files corresponding to the number of color palettes from the video images captured by the infrared camera are stored in the recording medium. This configuration allows the user to designate a desired color palette in reproducing the video images, and thus, the video images using the designated color palette can be reproduced. This achieves increased visibility for the video images.

A fifth exemplary embodiment of the present disclosure will be described below. In the fourth exemplary embodiment, moving image files for all the color palettes stored in the infrared camera are generated. However, there may be a case in which the number of moving image files that can be generated simultaneously is limited depending on the encoder or the writing performance of the recording medium.

A description will be provided of a moving image file generation method according to the present exemplary embodiment in a case where the number of files that can be generated simultaneously is limited. The component or step having a similar function to that in the fourth exemplary embodiment is given the same reference numeral, and description of those that are similar in configuration or function to those in the fourth exemplary embodiment is omitted.

FIG. 17 illustrates an example of color palette management information held in the ROM 103 of the camera. The priority (priority order) is set for each color palette, and a moving image file to be generated is determined according to the priority order. In FIG. 17, a color palette with a smaller value of priority has a higher priority. In a case where the number of files that can be generated simultaneously is less than the total number of color palettes, a moving image file using a color palette having a low priority is not generated.

The number of files that can be generated simultaneously is determined based on the performance of encoding processing executed by hardware or software and the speed of writing to the recording medium, such as a SD card. In the present exemplary embodiment, the resolution and frame rate of a moving image to be encoded are fixed.

In a case where the number of files that can be generated simultaneously is N, moving image files using a color palette having a priority value of 1 to N, represented in FIG. 17, are generated. Alternatively, instead of the number of files that can be generated simultaneously, simply a predetermined number of moving image files selected from among the moving image files in decreasing order of priority of the color palette can be output.

As described above, according to the present exemplary embodiment, a moving image file based on a user-desired color palette is stored on a priority basis even in the case where the number of files that can be generated simultaneously is less than the number of stored color palettes.

A sixth exemplary embodiment of the present disclosure will be described below. In the fifth exemplary embodiment, there are moving image files that cannot be generated depending on the priority order. In the present exemplary embodiment, a method will be described in which moving image files for all the color palettes are generated even in the case where the number of files that can be generated simultaneously is less than the number of color palettes held in the camera. The component or step having a similar function to that in the fourth or fifth exemplary embodiment is given the same reference numeral, and description of those that are similar in configuration or function to those in the fourth or fifth exemplary embodiment is omitted.

FIG. 18 illustrates a table in which the resolution and frame rate in encoding are added to the color palette management information illustrated in FIG. 17. In a case of encoding using a color palette having a priority of 1, moving image data is generated using the user-desired resolution and frame rate. In a case of encoding using a color palette having a priority that is not 1, the resolution and frame rate are reduced until generation of moving image files using all the color palettes is possible. The resolution and frame rate in this case are determined based on the performance of encoding processing and the speed of writing to the recording medium as in the second exemplary embodiment.

As described above, according to the present exemplary embodiment, the load of encoding and the amount of data to be written to a file are reduced so that moving image files for all the color palettes can be generated.

A seventh exemplary embodiment of the present disclosure will be described below. A network camera for monitoring has an upper limit on the amount of image data that can be recorded in the camera, so that it is desirable to record image data as efficiently as possible.

In the present exemplary embodiment, a method for efficiently saving image data using a motion detection function of a camera and reproducing image data in synchronization with separately-saved moving image data in the video image recording method according to the fourth exemplary embodiment will be described below. The component or step having a similar function to that in the fourth, fifth, or sixth exemplary embodiment is given the same reference numeral, and description of those that are similar in configuration or function to those in the fourth, fifth, or sixth exemplary embodiment is omitted.

In the case of saving the plurality of moving image files according to the fourth exemplary embodiment, there can be a case in which there is no change in the saved images. Thus, the amount of image data is able to be reduced by saving the plurality of moving image files only if there is a motion, by using the motion detection function (not illustrated) of the camera. In the motion detection function, the CPU 102 acquires a difference between previous and next frame images (infrared images) or a difference between a previously-acquired background image (infrared image) and a current frame image (infrared image), and if the difference area is greater than or equal to a predetermined size, the CPU 102 detects the difference as a motion.

Figure 19:
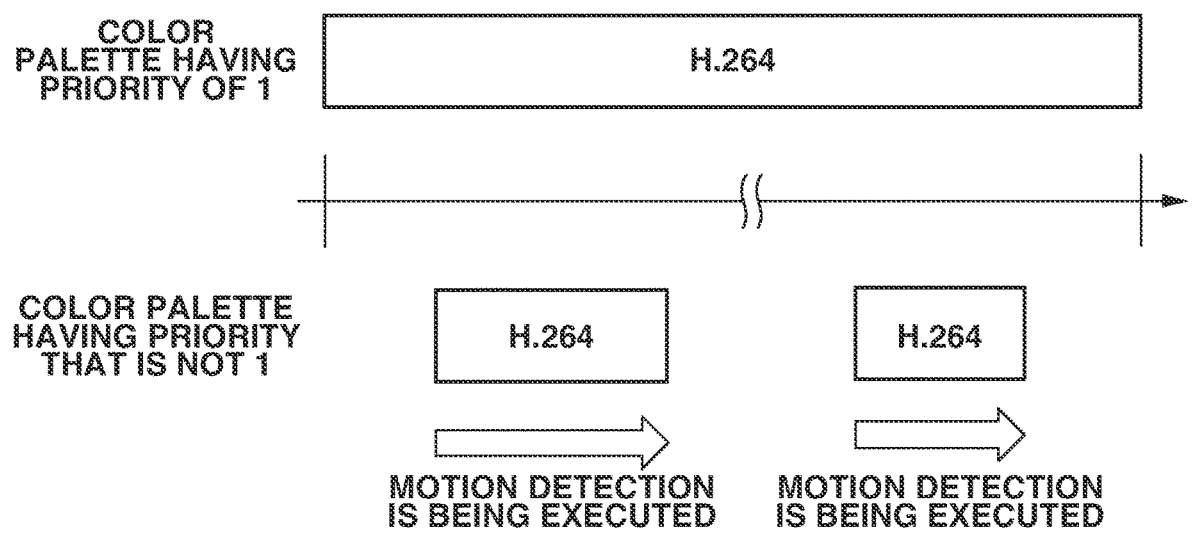
FIG. 19 is a schematic diagram illustrating chronological recording timings.

FIG. 19 illustrates chronological timings of saving moving image data according to the present exemplary embodiment. A moving image using a color palette having a priority of 1 in the fifth exemplary embodiment is continuously recorded, whereas, for a moving image using a color palette having a priority that is not 1, the occurrence of a recording start event based on the motion detection function triggers the start of recording. The saving operation ends when a motion is not detected.

The methods according to the fifth and sixth exemplary embodiments can be used in combination as a method for recording a moving image file based on the priority of a color palette.

As described above, according to the present exemplary embodiment, the amount of data to be stored in the recording medium is reduced so that missing of image capturing due to insufficient capacity is reduced.

An eighth exemplary embodiment of the present disclosure will be described below. In a system including a network camera, video image data is generally reproduced by a viewer application (hereinafter, "viewer") operating on a client apparatus that is a distribution destination.

In the present exemplary embodiment, a method will be described in which reproduction of index image data and color palette switching are realized with a client apparatus.

Figure 20:
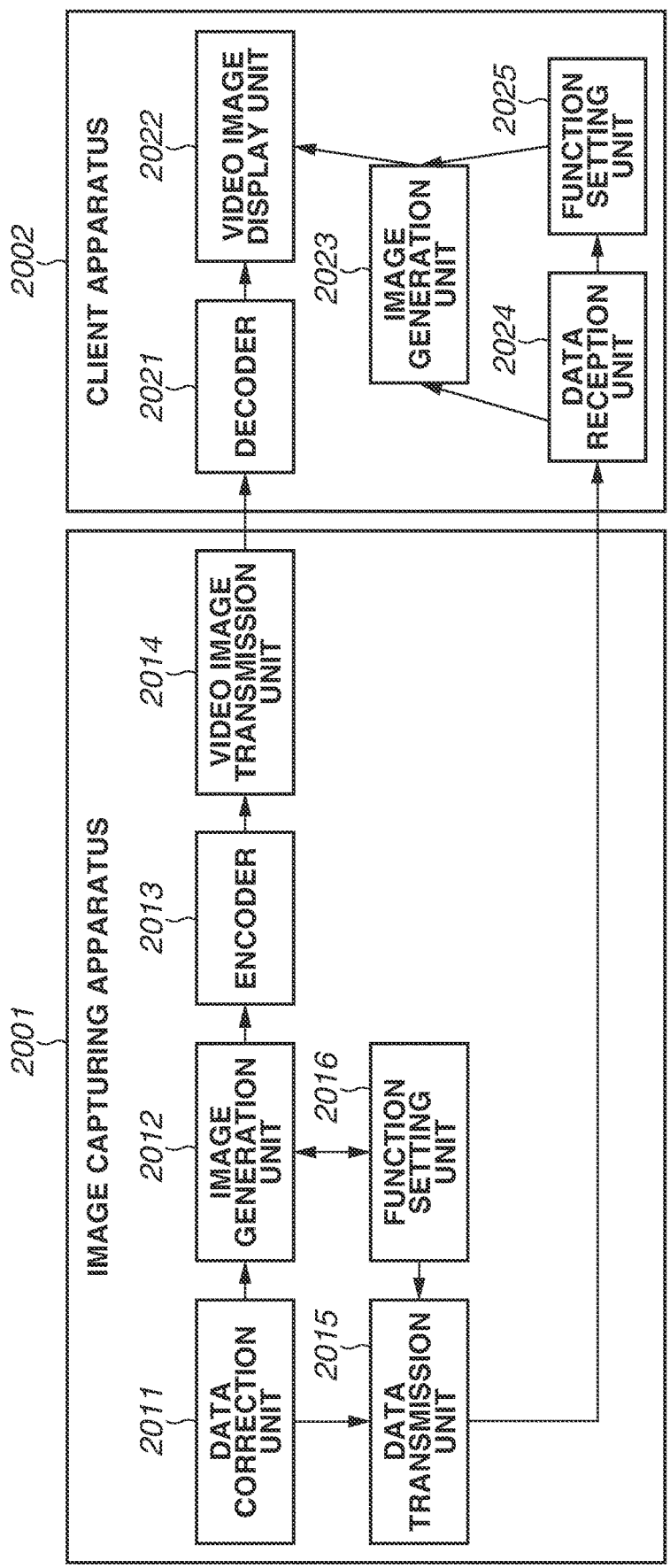
FIG. 20 is a block diagram illustrating an example of a schematic system configuration.

A configuration and function of each component of an image capturing apparatus 2001 and a client apparatus 2002 according to the present exemplary embodiment will be described below with reference to FIG. 20. The component or step having a similar function to that in any one of the first to seventh exemplary embodiments is given the same reference numeral, and description of those that are similar in configuration or function to those in any one of the first to seventh exemplary embodiments is omitted.

As in the first exemplary embodiment, a data correction unit 2011 converts information received from a sensor into index values for referring to a color palette. A data transmission unit 2015 receives image data converted to the index values from the data correction unit 2011 and stores the received image data in PNG file format. Further, table information about a plurality of color palettes settable by a function setting unit 2016 is also stored.

A data reception unit 2024 receives the color palette table information from the data transmission unit 2015 and stores the color palette table information in the client apparatus 2002 in advance. The user can select a color palette to be used for image display by using a function setting unit 2025 of the client apparatus 2002.

Moving image data to be distributed from the image capturing apparatus 2001 to the client apparatus 2002 is processed by an image generation unit 2012, an encoder 2013, and a video image transmission unit 2014 of the image capturing apparatus 2001 in this order and then transmitted to the client apparatus 2002 via a network. A decoder 2021 converts the received compressed moving image data into reproducible video image data and transmits the reproducible video image data to a video image display unit 2022. The video image display unit 2022 displays the video image on a viewer screen.

Next, a method for reproducing index image data in the client apparatus 2002 will be described below.

The data reception unit 2024 of the client apparatus 2002 receives the index image data stored in PNG file format from the data transmission unit 2015 of the image capturing apparatus 2001. It is typical to use a data transmission protocol, such as Hypertext Transfer Protocol (HTTP) or File Transfer Protocol (FTP) as a method for exchanging data.

An image generation unit 2023 of the client apparatus 2002 generates image data converted to the color information contained in the color palette using the index values of the image and transmits the generated image data to a video image display unit 2022. A video image display unit 2022 displays the image data on the viewer screen.

As described above, according to the present exemplary embodiment, in the case of reproducing the images captured by the infrared camera, the user can designate a desired color palette and reproduce the images at the client apparatus side. This achieves increased visibility of the video images. Further, the methods according to the second, third, sixth, and seventh exemplary embodiments are also applicable to the configuration according to the present exemplary embodiment.

Other Exemplary Embodiment

While the example in which the image generation unit 602 converts the index image data into RGB image data having a bit depth of 8 bits is described in the above-described exemplary embodiments, the index image data can be converted into image data of a different color space for display or image data having a different bit depth, such as 10 bits.

The configurations according to the above-described exemplary embodiments enable improvement in the visibility of video images in reproducing image data captured by an image capturing apparatus, such as a camera.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-104907, filed May 31, 2018, and No. 2018-142031, filed Jul. 30, 2018, which are hereby incorporated by reference herein in their entirety.

What is claimed is:

1. An image capturing apparatus comprising:
   an image sensor configured to capture an infrared image and generate image data;
   one or more processors; and
   one or more memories including instructions that, when executed by the one or more processors, cause the image capturing apparatus to:
   hold a plurality of color palettes;
   convert the image data into image data for display based on a color palette of the plurality of color palettes;
   determine, from among the plurality of color palettes, the color palette that is to be used to convert the image data;
   generate moving image data based on the image data for display; and
   output a plurality of moving image files in association with each other, the plurality of moving image files being generated and each corresponding to a different one of the plurality of color palettes different from each other,
   wherein an order of priority of each of the plurality of color palettes is held, and outputs a predetermined number of moving image files selected from among the plurality of moving image files in descending order of priority held.

2. The image capturing apparatus according to claim 1, wherein the one or more processors further cause the image capturing apparatus to:
   generate image data for reference in which at least one of the plurality of color palettes is associated with the image data; and
   record the image data for reference,
   wherein the image data is converted into the image data for display based on a first color palette held, and
   wherein the image data is generated for reference in which a second color palette is associated with the image data.

3. The image capturing apparatus according to claim 2, wherein the one or more processors further cause the image capturing apparatus to transmit, to a client apparatus, the generated image data for display and the generated image data for reference.

4. The image capturing apparatus according to claim 3, wherein the time information is added to the image data for reference, and
   wherein the image data for display and the image data for reference are transmitted in synchronization with each other.

5. The image capturing apparatus according to claim 2, wherein the image data for reference is converted into the image data for display using the second color palette.

6. The image capturing apparatus according to claim 2, wherein the first color palette is a color palette for monochrome display.

7. The image capturing apparatus according to claim 2, wherein the second color palette is a color palette for color display.

8. The image capturing apparatus according to claim 2, wherein a portable network graphics (PNG) format file is generated as the image data for reference.

9. The image capturing apparatus according to claim 2, wherein the one or more processors further cause the image capturing apparatus to detect a motion based on the image data captured by the image sensor,
   wherein the image data for reference is generated in a case where a motion is detected.

10. The image capturing apparatus according to claim 1, wherein the one more processors further cause the image capturing apparatus to record, in a recording medium, a moving image output.

11. The image capturing apparatus according to claim 1, wherein each of the plurality of color palettes is held in association with a parameter for use in encoding, and
    wherein a moving image file encoded using the parameter is outputted.

12. The image capturing apparatus according to claim 1, wherein the one or more processors further cause the image capturing apparatus to detect a motion from the image data generated by the image sensor,
    wherein, in a case where a motion is not detected, a first color palette is referred to and moving image file is outputted, and, in a case where a motion is detected, the first color palette and a second color palette are referred to and a plurality of moving image files are outputted.

13. The image capturing apparatus according to claim 1, wherein the plurality of color palettes includes a color palette for monochrome display.

14. The image capturing apparatus according to claim 1, wherein the plurality of color palettes includes a color palette for color display.

15. The image capturing apparatus according to claim 1, wherein the image data includes a PNG format image.

16. A client apparatus communicably connected with an image capturing apparatus including an image sensor configured to capture an infrared image and generate image data, a conversion unit configured to convert the image data into image data for display based on a first color palette, a generation unit configured to generate image data for reference in which a second color palette is associated with the image data, and a recording unit configured to record the image data for reference, the client apparatus comprising:

a reception unit configured to receive a user-designated display mode;

a display unit configured to display one of the image data for display and the image data for reference based on a color palette corresponding to the user-designated display mode;

a moving image generation unit configured to generate moving image data based on the image data for display converted by the conversion unit; and an output unit configured to output a plurality of moving image files in association with each other, the plurality of moving image files being generated by the moving image generation unit and each corresponding to a different one of the plurality of color palettes different from each other, wherein a holding unit further holds an order of priority of each of the plurality of color palettes, and the output unit outputs a predetermined number of moving image files selected from among the plurality of moving image files in descending order of priority held by the holding unit.

17. A method for controlling an image capturing apparatus including an image sensor configured to capture an infrared image and generate image data, one or more processors and one or more memories including instructions that, when executed by the one or more processors, executed the method comprising:

holding a plurality of color palettes;

converting the image data into image data for display based on a color palette of the plurality of color palettes;

determining, from among the plurality of color palettes, the color palette that is to be used in the converting;

generating moving image data based on the image data for display; and outputting a plurality of moving image files in association with each other, the plurality of moving image files being generated and each corresponding to a different one of the plurality of color palettes different from each other, holding an order of priority of each of the plurality of color palettes, and outputting a predetermined number of moving image files selected from among the plurality of moving image files in descending order of priority held.

18. The method according to claim 17, further comprising:

generating image data for reference in which at least one of the plurality of color palettes is associated with the image data; and recording the image data for reference, wherein, in the converting, the image data is converted into the image data for display based on a first color palette held by the holding, and wherein, in the generating, the image data for reference in which a second color palette is associated with the image data is generated.

19. The method according to claim 18, further comprising transmitting, to a client apparatus, the image data for display generated in the converting and the image data for reference generated in the generating.

20. The method according to claim 19, wherein, in the generating, time information is added to the image data for reference, and wherein, in the transmitting, transmits the image data for display and the image data for reference in synchronization with each other.

21. The method according to claim 18, wherein, in the converting, the image data for reference is converted into the image data for display using the second color palette.

22. The method according to claim 18, wherein the first color palette is a color palette for monochrome display.

23. The method according to claim 18, wherein the second color palette is a color palette for color display.

24. The method according to claim 18, wherein, in the generating, a PNG format file is generated as the image data for reference.

25. The method according to claim 18, further comprising detecting a motion based on the image data captured by the image capturing unit, wherein, in the generating, the image data for reference is generated in a case where a motion is detected in the detecting.

26. The method according to claim 17, further comprising:

generating moving image data based on the image data for display converted in the converting; and outputting a plurality of moving image files in association with each other, the plurality of moving files being generated in the generating and each corresponding to a different one of the plurality of color palettes different from each other.

27. The method according to claim 26, further comprising recording, in a recording medium, a moving image output in the outputting.

28. The method according to claim 26, wherein, in the holding, an order of priority of each of the plurality of color palettes is held, and, in the outputting, a predetermined number of moving image files selected from among the plurality of moving image files in descending order of priority held in the holding is output.

29. The method according to claim 26, wherein, in the holding, each of the plurality of color palettes is held in association with a parameter for use in encoding, and wherein, in the outputting, a moving image file encoded using the parameter is output.

30. The method according to claim 26, further comprising detecting a motion from the image data generated by the image capturing unit, wherein, in a case where a motion is not detected in the detecting, a first color palette is referred to, and a moving image file is output, and, in a case where a motion is detected in the detecting, the first color palette and a second color palette are referred to and a plurality of moving image files is output.

31. The method according to claim 26, wherein the plurality of color palettes includes a color palette for monochrome display.

32. The method according to claim 26, wherein the plurality of color palettes includes a color palette for color display.

33. The method according to claim 26, wherein the image data includes a PNG format image.

34. A method for controlling a client apparatus communicably connected with an image capturing apparatus including an image sensor configured to capture an infrared image and generate image data, one or more processors and one or more memories including instructions that, when executed by the one or more processors convert the image data into image data for display based on a first color palette, generate image data for reference in which a second color palette is associated with the image data, and record the image data for reference, the method comprising:

receiving a user-designated display mode;

displaying one of the image data for display and the image data for reference based on a color palette corresponding to the user-designated display mode;

generating moving image data based on the image data for display; and outputting a plurality of moving image files in association with each other, the plurality of moving image files being generated and each corresponding to a different one of the plurality of color palettes different from each other, wherein further holding an order of priority of each of the plurality of color palettes, and outputting a predetermined number of moving image files selected from among the plurality of moving image files in descending order of priority held.

35. A non-transitory computer-readable medium storing a program for causing a computer to execute a method comprising:

capturing an infrared image and generating image data;

holding a plurality of color palettes;

converting the image data into image data for display based on a color palette of the plurality of color palettes;

determining, from the plurality of color palettes, the color palette that is to be used in the converting;

generating moving image data based on the image data for display; and outputting a plurality of moving image files in association with each other, the plurality of moving image files being generated and each corresponding to a different one of the plurality of color palettes different from each other, wherein further holding an order of priority of each of the plurality of color palettes, and outputting a predetermined number of moving image files selected from among the plurality of moving image files in descending order of priority held.

36. The non-transitory computer-readable medium according to claim 35, the method further comprising:

generating image data for reference in which at least one of the plurality of color palettes is associated with the image data; and recording the image data for reference, wherein, in the converting, the image data is converted into the image data for display based on a first color palette held in the holding, and wherein, in the generating, the image data for reference in which a second color palette is associated with the image data is generated.

37. The non-transitory computer-readable medium according to claim 35, the method further comprising:

generating moving image data based on the image data for display converted in the converting; and outputting a plurality of moving image files in association with each other, the plurality of moving image files being generated in the generating and each corresponding to a different one of the plurality of color palettes different from each other.

* * * * *